(12) United States Patent
Takeuchi et al.

(10) Patent No.: US 10,162,328 B2
(45) Date of Patent: Dec. 25, 2018

(54) CONTROLLER AND CONTROL SYSTEM

(71) Applicant: OMRON Corporation, Kyoto-shi, Kyoto (JP)

(72) Inventors: Yoshitaka Takeuchi, Otsu (JP); Satoru Miura, Kusatsu (JP); Hiroshi Yoshida, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 167 days.

(21) Appl. No.: 15/123,026

(22) PCT Filed: Jan. 15, 2015

(86) PCT No.: PCT/JP2015/050943
§ 371 (c)(1),
(2) Date: Sep. 1, 2016

(87) PCT Pub. No.: WO2015/136970
PCT Pub. Date: Sep. 17, 2015

(65) Prior Publication Data
US 2017/0075335 A1    Mar. 16, 2017

(30) Foreign Application Priority Data
Mar. 14, 2014  (JP) ................................. 2014-052818

(51) Int. Cl.
*G05B 19/05*    (2006.01)

(52) U.S. Cl.
CPC .. *G05B 19/056* (2013.01); *G05B 2219/13004* (2013.01)

(58) Field of Classification Search
None
See application file for complete search history.

(56) References Cited

U.S. PATENT DOCUMENTS 5,864,738 A * 1/1999 Kessler ............... G06F 12/0817
                                                    709/239
6,701,284 B1* 3/2004 Huntley ................ G05B 19/05
                                                    702/187
(Continued)

FOREIGN PATENT DOCUMENTS

CN    102804086 A    11/2012
CN    102804087 A    11/2012
(Continued)

OTHER PUBLICATIONS

W Faltenbacher, "Computer Aided Software Configuration Management with KMS", IEEE, Oct. 5, 1988, pp. 18-25, XP055358675, Retrieved from the Internet: URL:http://ieeexplore.ieee.org/ielx2/215/626/00017142.pdf?tp=&arnumber=17142&isnumber=626 [retrieved on Mar. 24, 2017].
(Continued)

*Primary Examiner* — Isaac T Tecklu
(74) *Attorney, Agent, or Firm* — Metrolexis Law Group, PLLC

(57) ABSTRACT

The change stage of a user program is shared, and the suspension time of a device caused by updating the user program is shortened. A controller includes a first storage unit, a first change management unit, and a first user program generation unit. The first storage unit stores a data container. When the data container stored in the first storage unit is changed, the first change management unit stores a change record of the data container into a first update history. The first change management unit stores a new data container generated using the change record into the first storage unit. The first user program generation unit generates a user program using a user program resource contained in the new data container.

10 Claims, 10 Drawing Sheets

(56) References Cited

U.S. PATENT DOCUMENTS

| | | | |
|---|---|---|---|
| 7,168,075 B1* | 1/2007 | Barthel | G05B 19/0428 700/82 |
| 2005/0187989 A1* | 8/2005 | Kaneko | G06F 17/30067 |
| 2007/0174518 A1* | 7/2007 | Chandhoke | G05B 19/054 710/62 |
| 2010/0174387 A1* | 7/2010 | Ono | G05B 19/05 700/23 |
| 2011/0131562 A1* | 6/2011 | Tanaka | G06F 8/61 717/168 |
| 2011/0302444 A1* | 12/2011 | Tashima | G06F 9/4411 714/2 |
| 2012/0240132 A1* | 9/2012 | Kobayashi | G06F 9/4887 718/107 |
| 2012/0291036 A1* | 11/2012 | Taira | B25J 9/1656 718/102 |
| 2013/0124184 A1* | 5/2013 | Sakaguchi | G05B 19/4069 703/22 |
| 2013/0145141 A1* | 6/2013 | Han | G06F 8/65 713/2 |
| 2013/0226975 A1* | 8/2013 | Lee | G06F 17/3007 707/821 |
| 2013/0297548 A1* | 11/2013 | Cescolini | G06F 17/30 706/46 |
| 2013/0310976 A1* | 11/2013 | Taira | B25J 9/1656 700/250 |
| 2013/0317646 A1* | 11/2013 | Kimoto | B25J 9/1651 700/250 |
| 2014/0005805 A1* | 1/2014 | Nishiyama | G06F 9/544 700/74 |
| 2014/0012402 A1* | 1/2014 | Nishiyama | G05B 19/05 700/86 |
| 2014/0018939 A1* | 1/2014 | Ota | G05B 19/056 700/19 |
| 2014/0058538 A1* | 2/2014 | Yaoita | G06F 11/3636 700/28 |
| 2014/0058565 A1* | 2/2014 | Shimamura | G05B 19/056 700/275 |
| 2014/0165077 A1* | 6/2014 | Martinez Canedo | G06F 8/451 718/105 |
| 2016/0033953 A1* | 2/2016 | Nakagawa | G05B 19/056 700/29 |

FOREIGN PATENT DOCUMENTS

| | | |
|---|---|---|
| CN | 103080902 A | 5/2013 |
| CN | 103403632 A | 11/2013 |
| CN | 103403634 A | 11/2013 |
| CN | 103403684 A | 11/2013 |
| CN | 103419198 A | 12/2013 |
| CN | 103430111 A | 12/2013 |
| JP | H10-40085 A | 2/1998 |
| JP | 2005-234860 A | 9/2005 |
| JP | 2006-268485 A | 10/2006 |
| JP | 2008-282362 A | 11/2008 |
| JP | 2009-199229 A | 9/2009 |
| JP | 2009-223590 A | 10/2009 |

OTHER PUBLICATIONS

Muhammad A et al, "Combined application of Product Lifecycle and Software Configuration Management systems for ITER remote handling", Journal, Jun. 1, 2009, pp. 1367-1371, XP026171708, vol. 84, No. 7-11, Fusion Engineering and Design, Elsevier Science Publishers, Amsterdam, NL.

Japanese Office Action dated Jan. 9, 2018 in a related Japanese patent application.

Chinese Office Action dated Mar. 14, 2018 in a counterpart Chinese Patent application.

Japanese office action dated Jul. 24, 2018 in a related Japanese patent application.

* cited by examiner

Fig. 4

| Update No 119b-11 | Target 119b-12 | Change type 119b-13 | User 119b-14 | Date and time 119b-15 | User program generation 119b-16 | Notes 119b-17 |
|---|---|---|---|---|---|---|
| 11 | Resource B | Added | C | 2013/12/09/16:00 | | Resource B, added |
| 10 | Resource A | Corrected | A | 2012/12/10/17:00 | | Resource A, corrected |
| ..... | ..... | ..... | ..... | ..... | ..... | ..... |
| 9 | Resource A | Added | B | 2012/11/24/17:00 | O | Resource A, added |
| ..... | ..... | ..... | ..... | ..... | ..... | ..... |
| 1 | New | Added | A | 2012/11/22/15:00 | O | Initial generation |

CONTROLLER AND CONTROL SYSTEM

FIELD

The present invention relates to a controller for controlling a control target device by repeatedly executing a user program in every predetermined period, and to a control system including the controller.

BACKGROUND

A controller for controlling a control target device by repeatedly executing a user program generated by a user in every predetermined period may use a method known in the art for editing a user program (online editing) or specifically changing a part of a currently running user program.

For example, Patent Literature 1 describes a programmable logic controller (PLC) having the online editing function of rewriting an object code stored in the PLC using an object code part generated by compiling a part of the source program.

CITATION LIST

Patent Literature

Patent Literature 1: Japanese Unexamined Patent Application Publication No. 2009-223590

SUMMARY

Technical Problem

With the online editing function of the PLC described in Patent Literature 1, the changed source program is stored only in a program development support apparatus that has implemented the online editing function and changed the source program.

Developing a user program may involve multiple users (multiple program development support apparatuses). If a changed source program is stored only in a program development support apparatus that has implemented the online editing function, the stage of changes in the user program currently running on the PLC (or the change stage of the user program) cannot be shared by all the users. This lowers the development efficiency of the user program by multiple users.

When a user program is to be changed using the online editing function, the operation of a control target device controlled by the controller (in particular a control target device that can cause dangers if it is operating, such as a robot arm) is to be stopped until the editing of the user program is complete. In this case, the control target device may be suspended for a long time.

One or more aspects of the present invention are directed to a controller and a control system that allow sharing of the change stage of a currently running user program and shorten the suspension time of a control target device caused by changing the user program.

Solution to Problem

In response to the above issue, a plurality of aspects will now be described. These aspects can be freely combined as appropriate.

A controller according to one aspect of the invention includes a task execution unit, a first storage unit, a first change management unit, and a first user program generation unit.

The task execution unit executes a task repeatedly in a predetermined period. The task includes a user program for controlling a control target device. The first storage unit stores a data container containing a user program resource used to generate the user program.

The first change management unit stores a change record of the data container into a first update history and stores a new data container generated using the change record at a predetermined timing into the first storage unit when the data container stored in the first storage unit is changed.

The first user program generation unit generates the user program at the predetermined timing using a new user program resource contained in the new data container stored in the first storage unit.

In the controller, the first change management unit stores a change record of the data container into the first update history in response to a change in the data container stored in the first storage unit. The first change management unit also generates a new data container at a predetermined timing using the change record and stores the generated new data container into the first storage unit.

The first user program generation unit then generates a new user program at a predetermined timing using a new user program resource contained in the new data container stored in the first storage unit.

In the controller, the new data container containing the new user program resource used to generate the new user program is thus stored in the first storage unit. The change record of the data container is also stored in the first update history.

The controller allows sharing of information about the stage of change (change record) of the data container containing the user program resource that has been used to generate the currently running user program. More specifically, the controller allows sharing of information about the stage of change in the currently running user program.

The user program generation unit generates the user program at the predetermined timing. This shortens the suspension time of the control target device caused by updating the user program when the user program is changed with the online editing function. The suspension time of the control target device caused by updating the user program occurs only when the user program is generated (specifically, only at a predetermined timing).

In the controller, the predetermined timing may be a timing at which the first change management unit detects a change in the data container. This allows the controller to generate the latest updated user program using the most recently changed data container, while maintaining the details of the change in each stage of the data container in the change record.

In the controller, the predetermined timing may be a timing at which a user program generation instruction including change record designation information for designating a change record stored in the first update history used to generate the new data container is received from an external unit.

Further, the first user program generation unit may generate the user program using the new data container generated using the change record designated by the change record designation information.

This allows a new user program to be generated at a predetermined timing. Designating the change record in the first update history used to generate a new data container allows the user program to be generated using the data container at any designated stage of change (change record).

When a changed user program and a change data container are received by the controller from an external unit, the change data container may be stored into the first storage unit. The change data container is a data container containing a changed user program resource used to generate the changed user program.

Further, the first change management unit may store a change record of the change data container into the first update history. The changed program may be determined as a new user program that is subsequently executed by the task execution unit.

This allows sharing of information about a change in the user program made by an external unit.

A control system according to another aspect of the present invention includes the controller according to the above aspect and a server. The server is connected to the controller in a communicable manner. The server includes a second change management unit. The second change management unit stores a change record of the data container.

This allows the change record of the data container to be stored in the second change management unit, in addition to the first change management unit of the controller.

The second change management unit may store a duplicate update history as the second update history.

The duplicate update history is a copy of the first update history stored in the first change management unit. This allows the second change management unit to store the second update history, which is identical to the first update history. In other words, the first update history can be stored in the second change management unit as backup data.

The first change management unit stores a backup copy of the first update history into the second change management unit as the second update history. The first update history can also be stored in the second change management unit as backup data.

The second change management unit may receive a change in the data container from an external unit, and store an external change record into the second update history. The external change record is a change record of the data container received from the external unit. The second change management unit may also transmit the external change record to the first change management unit.

The first change management unit may store the external change record into the first update history, and store the data container generated based on the external change record at a predetermined timing into the first storage unit.

As a result, when a request to change the data container is transmitted from an external unit, the change record of the data container received from the external unit can be stored in both the first update history stored in the first change management unit and the second update history stored in the second change management unit.

When a changed user program and a change data container are received by the controller from an external unit, the change data container may be stored into the first storage unit and a change record may be stored into the second update history in the second change management unit. The changed program may be determined as a new user program that is subsequently executed by the task execution unit.

As a result, when the user program is changed by an external unit, the data container used to generate the user program by the external unit can be stored in both the first storage unit and the second update history. In other words, the data container can be stored as backup data.

A control system according to another aspect of the present invention includes a controller and a user program generation server.

In the control system, the controller includes a task execution unit, a first storage unit, and a first change management unit. The task execution unit executes a task repeatedly in a predetermined period. The task includes a user program for controlling a control target device. The first storage unit stores a data container containing a user program resource used to generate the user program. The first change management unit stores a change record of the data container into a first update history when the data container stored in the first storage unit is changed. The first change management unit stores a new data container generated using the change record at a predetermined timing into the first storage unit.

The user program generation server includes a third storage unit and a second user program generation unit.

The third storage unit receives and stores the data container generated in the first change management unit. The second user program generation unit generates the user program using a user program resource contained in the data container stored in the third storage unit. The second user program generation unit transmits the user program to the controller.

In the control system, the first change management unit generates a new data container using a change record at a predetermined timing, and then stores the new data container into the first storage unit and also into the third storage unit in the user program generation server. The new data container stored in the third storage unit is used to generate a user program.

In this manner, the user program can be generated by an external server (user program generation server). This reduces the computational load of the controller.

Advantageous Effects

The controller and the control system allow sharing of the change stage of a currently running user program, and shorten the suspension time of a control target device caused by changing the user program.

BRIEF DESCRIPTION OF THE DRAWINGS

FIG. 4 shows the structure of a first update history in one example.

DETAILED DESCRIPTION

1. First Embodiment

(1) Overall Configuration of Control System

Figure 1:
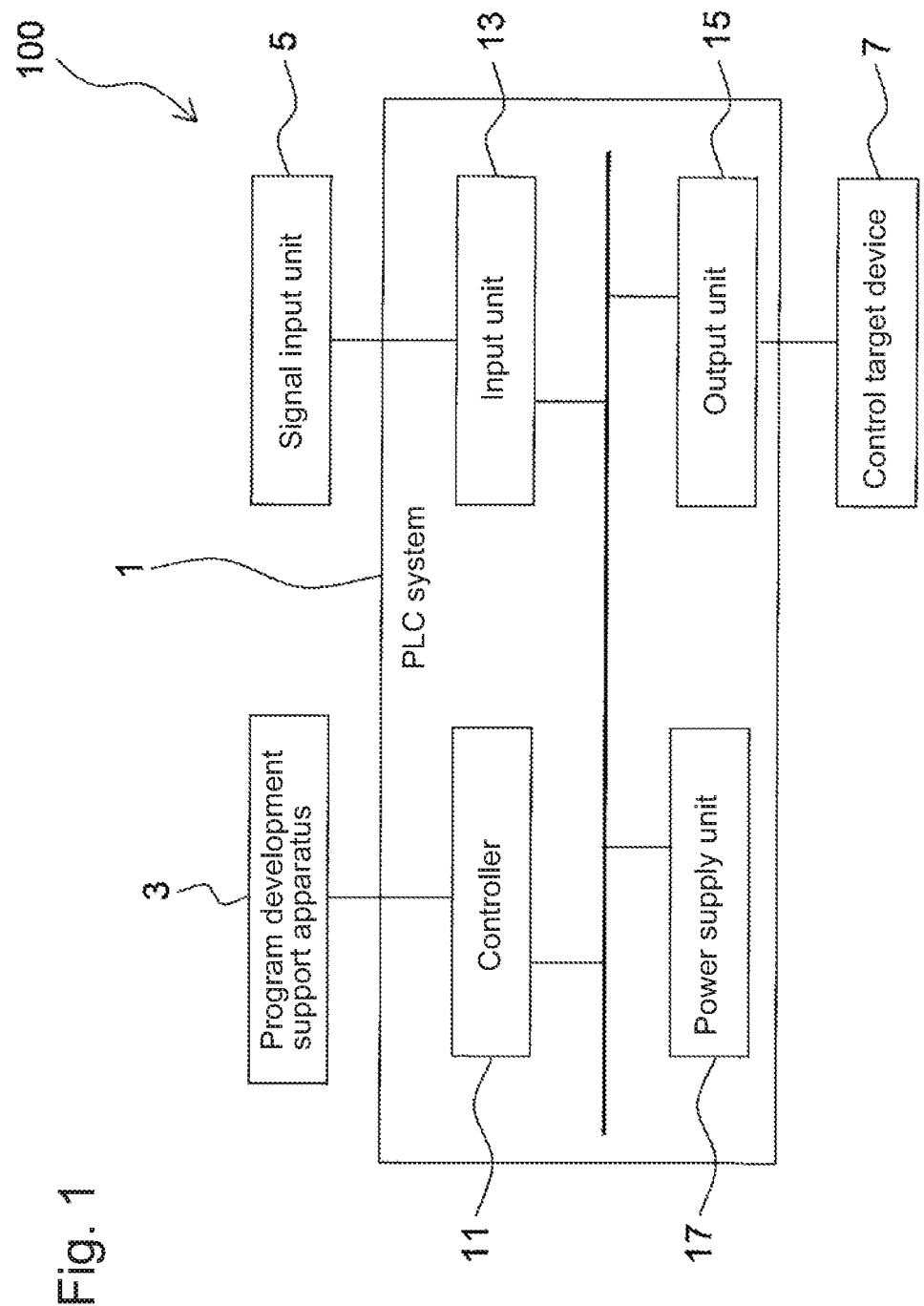
FIG. 1 is a diagram showing the overall configuration of a control system according to a first embodiment.

The overall configuration of a control system 100 according to a first embodiment will now be described with reference to FIG. 1. FIG. 1 is a diagram showing the overall configuration of the control system according to the first embodiment. The control system 100 includes a programmable logic controller (PLC) system 1 and a program development support apparatus 3.

The PLC system 1 receives a signal from a signal input unit 5, which is for example a sensor or a switch. The PLC system 1 executes a program using an input signal from the signal input unit 5 (described later) as appropriate to calculate an output signal for controlling a control target device 7.

The program development support apparatus 3 has various capabilities including an editing function for generating or changing a user program 1131 (FIGS. 3A and 3B) that is executed in a controller 11 included in the PLC system 1. A single program development support apparatus 3 is connectable to the PLC system 1, or any other number of program development support apparatuses 3 permitted by the number of addresses assignable to such program development support apparatuses 3 may be connected to the PLC system 1.

The configuration of the PLC system 1, the controller 11, and the program development support apparatus 3 will now be described in detail below.

(2) PLC System Configuration

The configuration of the PLC system 1 will now be described in detail with reference to FIG. 1. The PLC system 1 according to the present embodiment includes the controller 11, an input unit 13, an output unit 15, and a power supply unit 17.

The controller 11 according to the present embodiment is a central processing unit (CPU) included in a programmable logic controller (PLC). In the controller 11, an input signal input into the input unit 13 (described later) is associated with an input variable used in the controller 11, and an output signal output to the output unit 15 (described later) is associated with an output variable used in the controller 11.

In the controller 11, a predetermined task is repeatedly executed in every predetermined period. A task is a unit of processing including I/O refresh processing for updating an input variable based on an input signal from the input unit 13 and updating an output signal to the output unit 15 based on an output variable, and processing for executing a user program 1131 and/or a system program 115a (described later). A task may further include other processing such as motion control processing, or may include only the processing for executing a program.

The input unit 13 receives an input signal from the signal input unit 5, such as a sensor or a switch, and outputs the input signal to the controller 11. The input unit 13 may be selected in accordance with the type of a signal input from the signal input unit 5. More specifically, when, for example, the signal input unit 5 is a thermocouple for measuring temperature, the input unit 13 may be an input unit for receiving an input signal indicating a voltage generated in the thermocouple. When, for example, the signal input unit 5 is an electrical switch, the input unit 13 may be an input unit for receiving an input signal indicating the on or off state of the switch.

The output unit 15 outputs an output signal associated with an output variable of the controller 11 to the corresponding control target device 7. This allows the controller 11 to control the control target device 7 based on an output variable calculated by executing a program.

The output unit 15 may be selected in accordance with the type of an output signal. When, for example, the control target device 7 is a motor for which positional control is to be performed, an output unit with a motion controller function may be used. When, for example, the control target device 7 is an electric furnace, an output unit may output a signal for controlling a relay that controls the electric furnace (e.g., a signal for controlling the on/off duty ratio).

The power supply unit 17 supplies power to the controller 11, the input unit 13, and the output unit 15.

The PLC system 1 may have all these components accommodated in a single housing, or may have the components individually accommodated in separate housings and connected to one another. In particular, the PLC system 1 including the input unit 13 and the output unit 15 as separate components allows intended numbers of intended control target devices and signal input units to be connected to the system.

(3) Configuration of Controller

I. Overall Configuration

Figure 2:
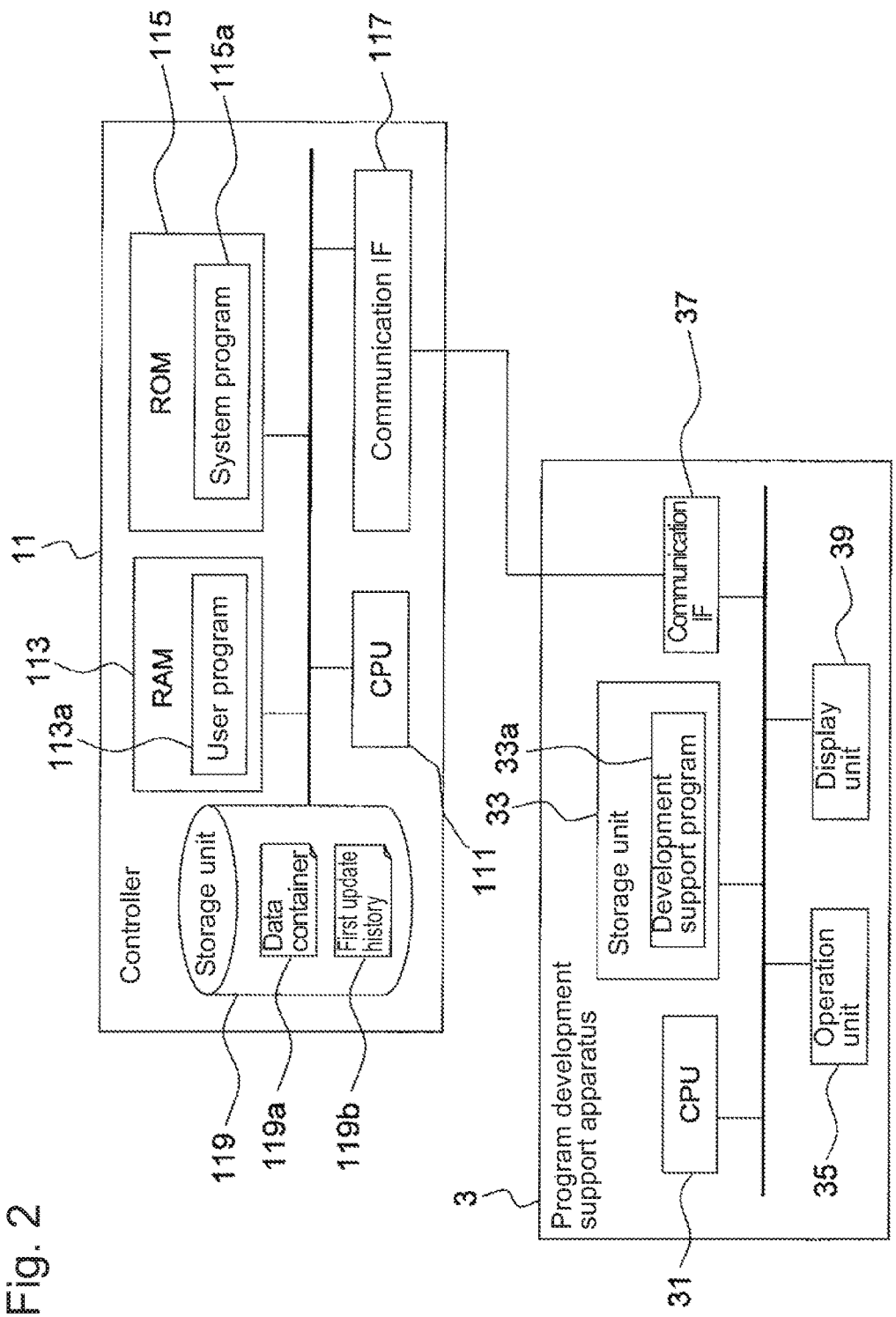
FIG. 2 is a diagram showing the configuration of a controller and a development support apparatus.
Figure 3A:
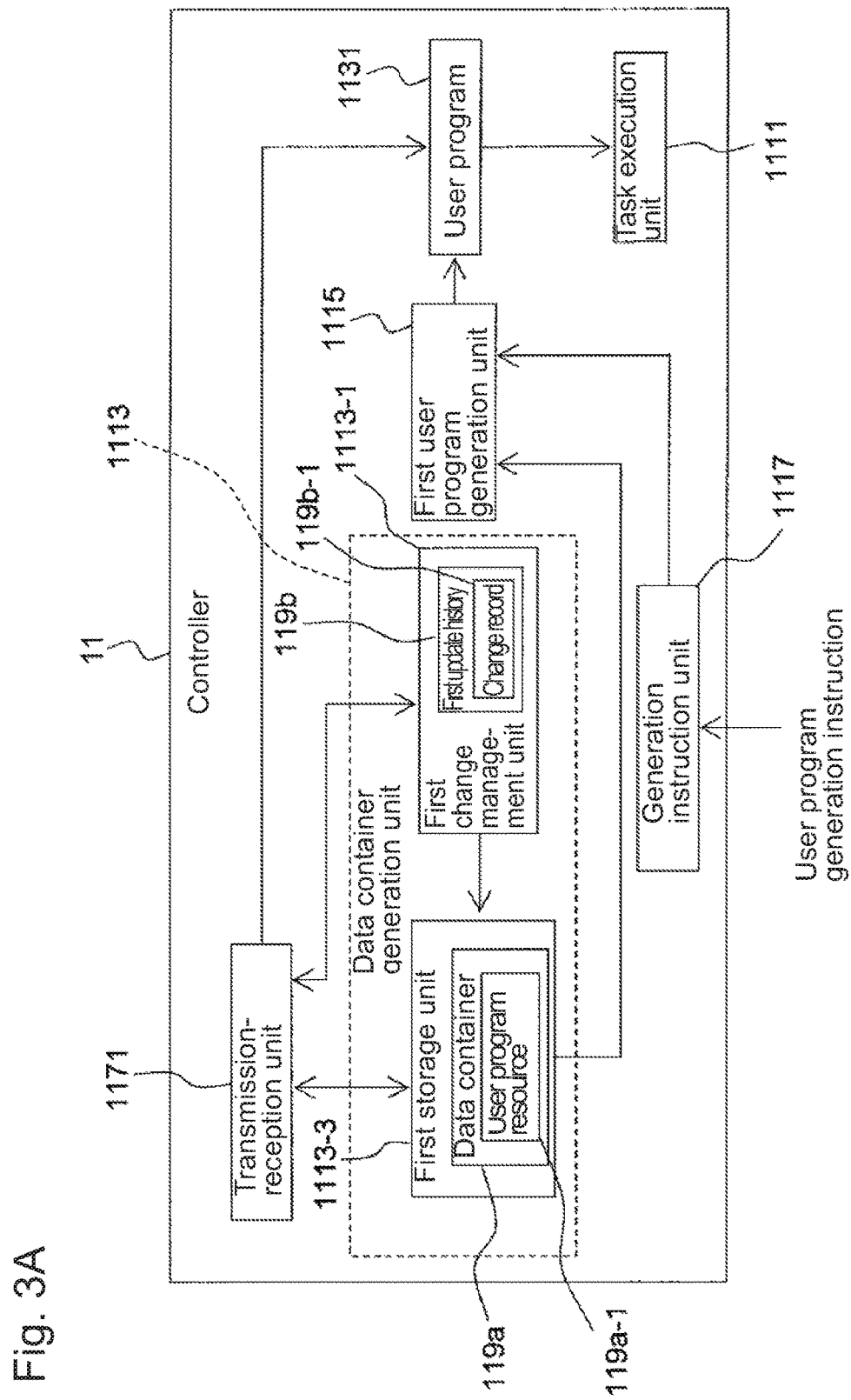
FIG. 3A is a diagram showing the configuration of the controller in detail.

The configuration of the controller 11 will now be described in detail with reference to FIGS. 2 and 3A. FIG. 2 is a diagram showing the configuration of the controller and the development support apparatus. FIG. 3A is a diagram showing the configuration of the controller in detail.

As described above, the controller 11 is the CPU of the PLC system. As shown in FIG. 2, the controller 11 includes a CPU 111, which is responsible for computational processing such as program execution, a random access memory (RAM) 113, which provides a writable and readable storage area, a read-only memory (ROM) 115, which mainly provides a read-only storage area, a communication interface 117 through which communication is performed with the program development support apparatus 3, and a storage unit 119.

The communication interface 117 allows data transmission and reception based on a data communication protocol such as TCP/IP (Transmission Control Protocol/Internet Protocol). This enables the controller 11 to transmit and receive data to and from the number of program development support apparatuses 3 permitted by the number of assignable addresses.

The storage unit 119 provides storage for various data. In the present embodiment, examples of data stored in the storage unit 119 include a new data container 119a (described later) and a first update history 119b (described later). The storage unit 119 may include a compact storage medium such as an SD memory card and a device for writing and reading data to and from the storage medium (not shown).

The components of the controller 11 implementing its various functions will now be described in more detail with reference to FIG. 3A. In the present embodiment, the functions of the components of the controller 11, which are described below, are implemented by the CPU 111 of the controller 11 shown in FIG. 2 executing the system program 115a stored in the ROM 115.

As shown in FIG. 3A, the controller 11 includes a task execution unit 1111, a data container generation unit 1113, a first user program generation unit 1115, a generation instruction unit 1117, and a transmission-reception unit 1171.

The task execution unit 1111 refers to the user program 1131 for controlling the control target device 7 stored in the RAM 113, and repeatedly executes the task including the user program 1131 in every predetermined period. The task execution unit 1111 may also execute multiple tasks.

The task execution unit 1111 executes the user program 1131 to calculate an output variable used in the controller 11 and associated with an output signal in the control system 100.

Through the I/O refresh processing described above, the task execution unit 1111 instructs the output unit 15 to output an output signal based on the output variable calculated by the user program. This controls the control target device 7 connected to the output unit. In other words, the user program 1131 is executed to control the control target device 7.

The data container generation unit 1113 generates and stores a new data container 119$a$, which is used by the first user program generation unit 1115 (described later) to generate an updated new user program 1131. The new data container 119$a$ contains a user program resource 119$a$-1 to be used to generate the new user program 1131.

The data container 119$a$ is a data folder collectively storing at least one user program resource 119$a$-1 (typically a plurality of user program resources) to be used to generate the user program 1131. To generate the user program 1131 with the data container 119$a$, at least one user program resource 119$a$-1 stored in the data container 119$a$ is referred to by a user program generation program running in the first user program generation unit 1115 (described later) and the program development support apparatus 3.

The user program resource 119$a$-1 is a configuration file including a source program (user recognizable program) used to generate a user program 1131 or including various pieces of configuration information. The configuration information includes physical information indicating the hardware configuration of the control system 100 and the connections between the pieces of hardware, and logical information such as the setting of the hardware, the mapping setting of variables, and the task setting.

The data container generation unit 1113 uses a change record 119$b$-1 stored in the first update history 119$b$ (described later) to generate a new data container 119$a$. The data container generation unit 1113 thus stores the first update history 119$b$. The change record 119$b$-1 includes the details of a change in the user program 1131 (data container 119$a$) (e.g., information identifying a changed user program resource 119$a$-1 or the details of the change, or the resultant difference) as described later.

The configuration of the data container generation unit 1113 will be described in detail later.

The first user program generation unit 1115 uses a user program resource 119$a$-1 included in a new data container 119$a$ stored in the data container generation unit 1113 (more specifically, a first storage unit 1113-3 described later) to generate a user program 1131. The first user program generation unit 1115 generates the user program 1131 in response to an instruction from the generation instruction unit 1117 (described later).

Thus, the first user program generation unit 1115 is, for example, a compiler for generating a program executable in the controller 11 using a user program resource 119$a$-1 in the data container 119$a$.

The generation instruction unit 1117 instructs the first user program generation unit 1115 to generate a user program. As shown in FIG. 3A, the generation instruction unit 1117 instructs the first user program generation unit 1115 to generate a user program when receiving a user program generation instruction from an external unit (e.g., the program development support apparatus 3).

The first user program generation unit 1115 can generate a user program 1131 upon receipt of a user program generation instruction from an external unit (program development support apparatus 3). In other words, the user program 1131 can be generated at any designated timing.

The user program generation instruction includes change record designation information for designating a change record 119$b$-1 in the first update history 119$b$ used for generating a new data container. The first user program generation unit 1115 can thus use a data container generated at any designated stage of change (change record) to generate the user program 1131.

For example, in response to a user program generation instruction received during execution of update No. 11 in the first update history 119$b$ shown in FIG. 4 with the change record designation information designating update No. 9, the first user program generation unit 1115 generates a new user program 1131 by using the data container 119$a$ reflecting the change records 119$b$-1 of up to update No. 9 (change records with update Nos. 6 to 9 in the example of FIG. 4).

The transmission-reception unit 1171 allows data communications between the controller 11 and an external unit (program development support apparatus 3 in the present embodiment). The transmission-reception unit 1171 functions as the communication interface 117 described above.

When receiving a changed user program and a change data container from the external unit (program development support apparatus 3), the transmission-reception unit 1171 performs the processing described below. The changed user program 1131 is an executable user program 1131 generated in the program development support apparatus 3. The change data container 119$a$ is a data container 119$a$ containing the changed user program resource 119$a$-1 used when the changed user program 1131 is generated.

After receiving the changed user program 1131 and the change data container 119$a$, the data container generation unit 1113 stores them into the first storage unit 1113-3 (described later). Also, a first change management unit 1113-1 (described later) stores the received change data container 119$a$ into the first update history. Additionally, the (currently running) user program 1131 stored in the RAM 113 is replaced with the received changed user program. In other words, the received changed user program 1131 is used as the new user program 1131 to run in the task execution unit 1111 when a subsequent task is executed.

In this manner, when the user program 1131 is changed in an external unit, such as the program development support apparatus 3, the currently running user program 1131 is replaced with the changed user program 1131.

The change data container 119$a$ used to generate the changed user program 1131 is stored in the first update history 119$b$. This allows sharing of information about the details of a change in the user program 1131 made by an external unit.

II. Configuration of Data Container Generation Unit

The configuration of the data container generation unit 1113 will now be described with reference to FIG. 3A. As shown in FIG. 3A, the data container generation unit 1113 includes the first change management unit 1113-1 and the first storage unit 1113-3. In response to a change in the data container stored in the first storage unit 1113-3 (or specifically the data container 119$a$ used to generate the currently running user program 1131), the first change management unit 1113-1 stores the change record 119$b$-1 of the data container into the first update history 119$b$.

When storing the change record 119$b$-1 into the first update history 119$b$, the first change management unit 1113-1 records, as the change record 119b-1, the resultant difference in the user program resource 119a-1 contained in the data container 119a stored in the first storage unit 1113-3 (described later).

When the first user program generation unit 1115 or the program development support apparatus 3 generates the user program 1131, the source file is compiled to reflect the setting in the configuration file and generate the executable user program 1131.

In addition to the change record 119b-1, the first change management unit 1113-1 also stores a new data container 119a generated using the change record 119b-1 into the first storage unit 1113-3 at a predetermined timing.

The first change management unit 1113-1 reflects the change record 119b-1 in the data container 119a stored in the first update history 119b to generate a new data container 119a.

To store, for example, an initial data container 119a into the first update history 119b, all the change records 119b-1 between the generation of the initial data container 119a and the current change record 119b-1 are used for the data container 119a stored in the first update history 119b. The initial data container 119a described above is used to initially generate a user program 1131 without based on previous data.

The data container 119a stored in the first update history 119b may not be the data container 119a used to initially generate the user program 1131. The data container 119a stored in the first update history 119b may be a data container 119a generated in a predetermined update stage (change record). In this case, the new data container 119a is generated by reflecting change records 119b-1 from the change record 119b-1 at generation of the data container 119a stored in the first update history 119b up to the current change record 119b-1. The above change records 119b-1 will be described in detail later.

The first storage unit 1113-3 stores the data container 119a. The first storage unit 1113-3 stores the data container 119a used to generate the currently running user program 1131. Thus, the details of the data container 119a used to generate the currently running user program 1131 can be obtained by referring to the data container 119a stored in the first storage unit 1113-3.

More specifically, the first storage unit 1113-3 stores the data container 119a used to generate the currently running user program 1131. This allows sharing of information about the stage of change (change record) of the data container including the user program resource 119a-1 that has been used to generate the currently running user program 1131.

The first change management unit 1113-1 may use the change records 119b-1 in the first update history 119b for the data container 119a stored in the first storage unit 1113-3 to generate a new data container 119a. In this case, the first change management unit 1113-1 can use the change records from the change record 119b-1 at generation of the data container 119a stored in the first storage unit 1113-3 up to the current change record 119b-1 for the data container 119a stored in the first storage unit 1113-3 to generate a new data container 119a.

III. Structure of Update History

The structure of the first update history 119b will now be described with reference to FIG. 4. FIG. 4 shows the structure of the first update history in one example.

As shown in FIG. 4, the first update history 119b includes an update number field 119b-11, an update target field 119b-12, an update type field 119b-13, an update user field 119b-14, an update date and time field 119b-15, a user program generation field 119b-16, and a note field 119b-17. One row of data recorded in the first update history 119b forms a single change record 119b-1.

The update number field 119b-11 stores the update number for identifying each change record 119b-1. The update target field 119b-12 stores information identifying each user program resource 119a-1 that has been changed. The term "New" in the update target field 119b-12 for update No. 1 indicates that the data container 119a for the user program 1131 has been newly generated.

The update type field 119b-13 stores the details of each update to the user program resource 119a-1 recorded in the update target field 119b-12. A new data container 119a used to generate a new user program 1131 can be generated by reflecting the details of the update recorded in the update type field 119b-13 in the user program resource 119a-1 recorded in the update target field 119b-12 in the first update history 119b or in the data container 119a stored in the first storage unit.

The update user field 119b-14 stores the name of a user who has made the change. The update date and time field 119b-15 stores the date and time when the change is made (update date and time). The user program generation field 119b-16 stores each change record 119b-1 for which user programs 1131 are generated. In the example shown in FIG. 4, the user program 1131 is either generated or received from an external unit at update No. 1 (initial generation) and update No. 6. In the example shown in FIG. 4, more specifically, the first storage unit 1113-3 currently stores the data container 119a at update No. 6. At the current timing (e.g., at update No. 12), the data container 119a can be generated by tracing back to the data container 119a at update No. 6 (the data container 119a with the latest update that can be currently generated is the data container 119a at update No. 6).

In the update history shown in FIG. 4, the first storage unit 1113-3 stores the data container 119a generated at update No. 6. This is because update No. 6 is the most recent update for the generated user program 1131.

The note field 119b-17 stores notes for each update. The user may enter notes at the time of an update to the data container 119a, or the first change management unit 1113-1 may enter notes for an update performed autonomously by the controller 11.

In the example shown in FIG. 4, the note field 119b-17 with update No. 6 shows "Resource A, added." In the same row, the update target field 119b-12 shows "Resource A," and the update type field 119b-13 shows "Added." In this manner, the note field 119b-17 can store short notes about the details of a change in the user program resource 119a-1 (the data container 119a).

Based on the first update history 119b shown in FIG. 4, the control system 100 can store the details of a change in the user program 1131 for every update. When the first update history 119b shown in FIG. 4 is viewable with, for example, the program development support apparatus 3, the user involved in developing the user program 1131 can operate the program development support apparatus 3 to visually check the details of changes in the user program.

The controller 11 of the present embodiment including these components allows sharing of information about the stage of change (change record 119b-1) of the data container 119a containing the user program resource 119a-1 that has been used to generate the currently running user program 1131. More specifically, the controller 11 allows sharing of information about the stage of change in the currently running user program 1131.

In the controller 11 described with reference to FIG. 3A, the first user program generation unit 1115 generates the user program 1131 when receiving an instruction to generate a user program from the program development support apparatus 3. The user program 1131 may be generated at any timing other than when receiving an instruction to generate a user program.

Figure 3B:
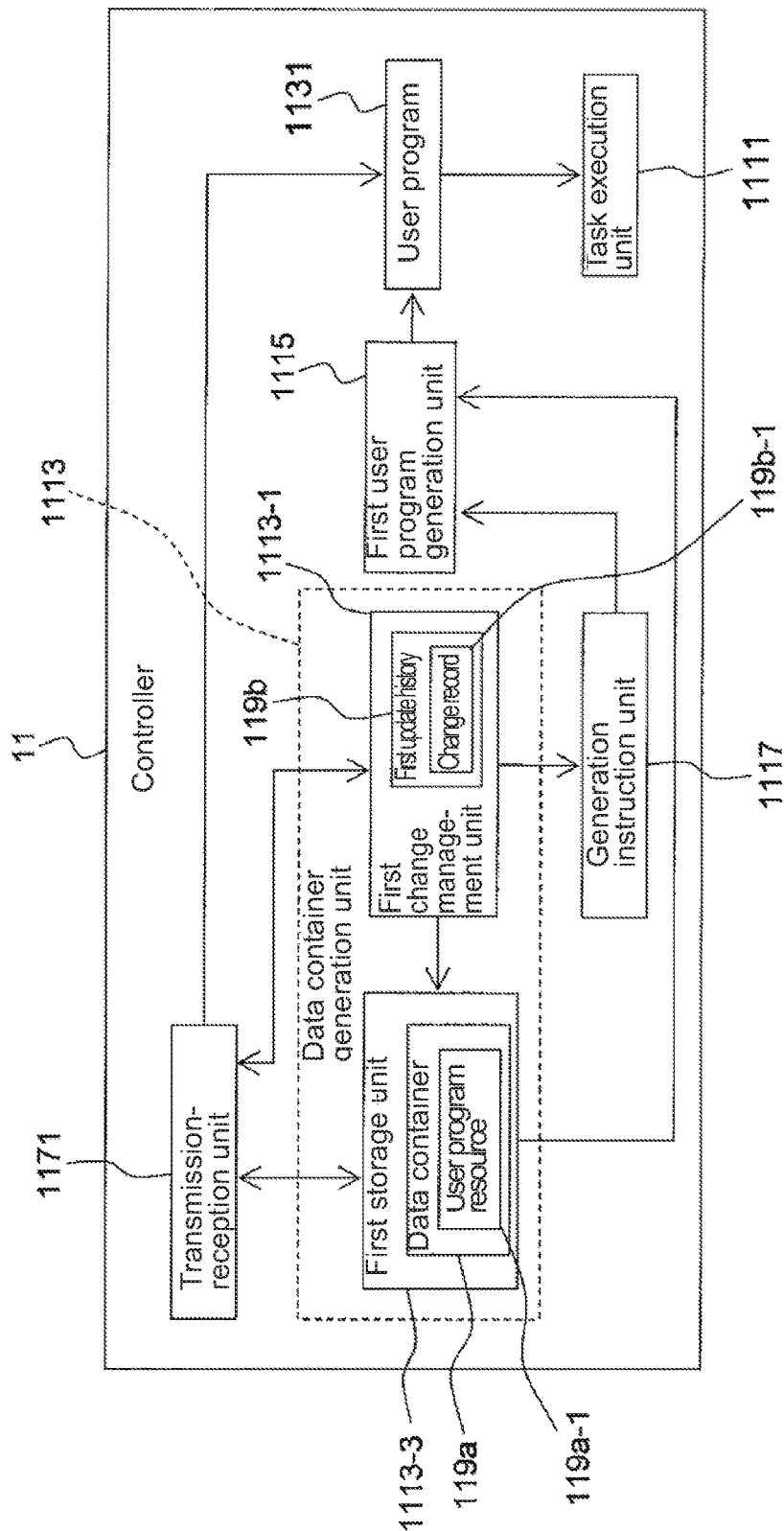
FIG. 3B shows a controller according to a modification.

In a modification shown in FIG. 3B, the generation instruction unit 1117 may receive an instruction from the first change management unit 1113-1 and then instruct the first user program generation unit 1115 to generate the user program 1131. More specifically, the user program 1131 may be generated in response to an instruction from the first change management unit 1113-1. FIG. 3B shows a controller according to the modification.

In this modification, the first change management unit 1113-1 may instruct the first user program generation unit 1115 to generate a user program 1131 every time when the first change management unit 1113-1 detects a change in the data container 119a. This allows generation of the latest updated user program 1131 using the most recently changed data container 119a, while maintaining the details of the change in each stage of the data container 119a in the change record 119b-1.

(4) Configuration of Program Development Support Apparatus

The configuration of the program development support apparatus 3 will now be described in detail with reference to FIG. 2.

The program development support apparatus 3 is, for example, a computer such as a personal computer. As shown in FIG. 2, the program development support apparatus 3 thus includes a CPU 31, which is responsible for computational processing such as program execution, a storage unit 33, which provides a storage area, an operation unit 35, which includes input devices such as a keyboard and a mouse, a communication interface 37, which allows communications with the controller 11, and a display unit 39, which performs display on a screen.

The communication interface 37 allows data transmission and reception to and from the controller 11 based on the same data communication protocol as used in the controller 11. In the present embodiment, the communication interface 37 is, for example, an interface allowing communications based on the TCP/IP protocol.

The program development support apparatus 3 can execute a development support program 33a stored in the storage unit 33 to edit or generate the user program 1131.

When editing the user program 1131 (data container 119a), the program development support apparatus 3 in the present embodiment downloads the data container 119a stored in the first storage unit 1113-3 (data container generation unit 1113) or the user program resource 119a-1 contained in the data container 119a and edits the data container 119a or the user program resource 119a-1.

As described above, the data container 119a stored in the first storage unit 1113-3 is the data container used to generate the user program 1131 currently running on the controller 11. Thus, downloading and editing the data container 119a stored in the first storage unit 1113-3 or the user program resource 119a-1 equates to changing the currently running user program 1131. More specifically, the online editing function is implemented by generating the data container 119a or the user program resource 119a-1 in this manner using the program development support apparatus 3.

After editing the data container 119a or the user program resource 119a-1, the program development support apparatus 3 can generate a user program 1131 changed using the edited data container 119a or the edited user program resource 119a-1 in response to an instruction from the user. The program development support apparatus 3 can determine whether to transmit the changed user program 1131 together with the data container 119a to the controller 11, or to transmit only the edited data container 119a or the edited user program resource 119a-1 to the controller 11.

In this manner, the program development support apparatus 3 can select whether to immediately reflect the edited data container 119a or the edited user program resource 119a-1 in the user program 1131, or to store the change as a change record 119b-1 in the controller 11 without immediately reflecting the change.

(5) User Program Updating in Control System

Figure 5:
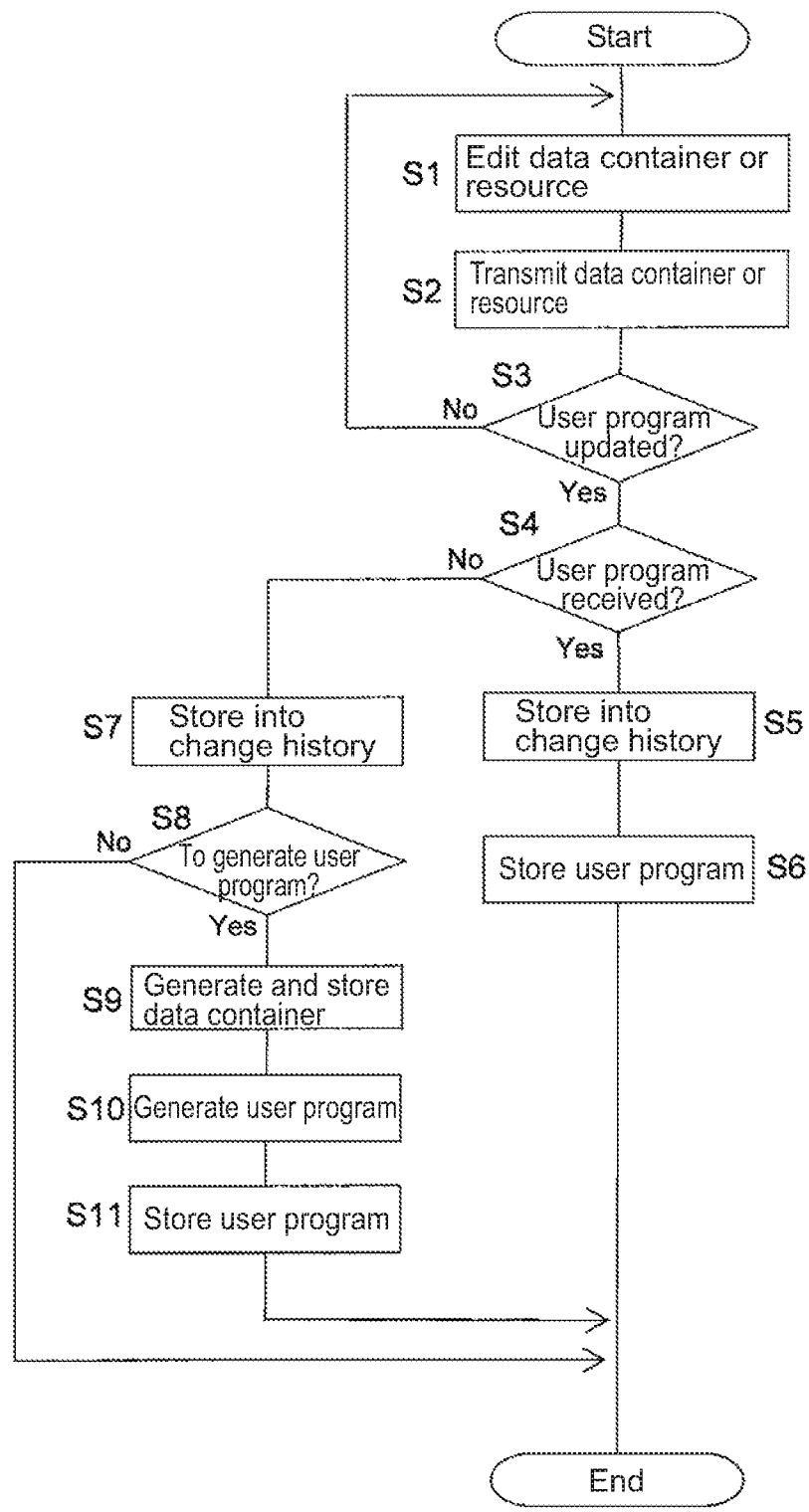
FIG. 5 is a flowchart showing a user program updating process performed in the control system.

The operation for updating the user program 1131 in the control system 100 (controller 11) will now be described with reference to FIG. 5. FIG. 5 is a flowchart showing a user program updating process performed in the control system. The operation for updating the user program 1131 described below is performed during execution of the user program 1131 in the controller 11 of the control system 100 (online editing).

First, the development support program 33a is executed in the program development support apparatus 3 to enable editing of the data container 119a or the user program resource 119a-1. The user operating the program development support apparatus 3 then edits the data container 119a or the user program resource 119a-1 (step S1).

More specifically, the program development support apparatus 3 receives, from the controller 11, the data container 119a stored in the first storage unit 1113-3 of the controller 11 or a user program resource 119a-1 to be edited in the data container 119a. The user then edits the received data container 119a or the received user program resource 119a-1. This changes the data container 119a stored in the first storage unit 1113-3.

After editing the data container 119a or the user program resource 119a-1, the program development support apparatus 3 transmits the edited data container 119a or the edited user program resource 119a-1 to the controller 11 (step S2). In step S1, the edited data container 119a or the edited user program resource 119a-1 may be used to generate a user program 1131, which may then be transmitted together with the edited data container 119a to the controller 11.

During editing of the data container 119a or the user program resource 119a-1 in the program development support apparatus 3, the controller 11 determines whether it has received the edited and changed data container 119a, the edited and changed user program resource 119a-1, and/or the changed user program 1131 (step S3).

When the controller 11 has received no data container 119a, no user program resource 119a-1, and/or no changed user program 1131 (No in step S3), the processing returns to step S1, and the controller 11 waits to receive the edited data container 119a, the edited user program resource 119a-1, and/or the changed user program 1131.

When the controller 11 has received the data container 119a, the user program resource 119a-1, and/or the changed user program 1131 (Yes in step S3), the controller 11 determines whether it has received the changed user program 1131 (step S4).

When the controller 11 has received the changed user program 1131 (Yes in step S4), the first change management unit 1113-1 stores the change record 119b-1 of the data container 119a received together with the changed user program 1131 into the first update history 119b (step S5).

Either the received entire data container 119a (all the user program resource(s) 119a-1) may be stored as the change record 119b-1, or the changed user program resource 119a-1 in the received data container 119a (the changed user program resource 119a-1) may be recorded as the change record.

In this manner, when the program development support apparatus 3 changes and transmits the user program 1131 in an executable format to the controller 11, the controller 11 can share information about the details of a change in the user program 1131.

The first change management unit 1113-1 stores the received data container 119a (change data container 119a) into the first storage unit 1113-3. The first change management unit 1113-1 instructs the transmission-reception unit 1171 to store the received changed user program 1131 into the area storing the currently running user program 1131 (step S6). This allows the received changed user program 1131 to be the new user program 1131 that is subsequently executed by the task execution unit 1111. As a result, the data container 119a, which has been used to generate the user program 1131 to be executed subsequently, is stored into the first storage unit 1113-3.

The updating process of the user program 1131 in the control system 100 ends.

When the user program is updated through the processing in steps S1 to S6, the control target device 7 is to be stopped only when the new user program 1131 is used in step S6. This shortens the suspension time of the control target device 7 caused by changing the user program 1131.

When the controller 11 has received no changed user program 1131 (No in step S4), the first change management unit 1113-1 stores a change record 119b-1 into the first update history 119b (step S7). In this case, the resultant difference from the data container 119a stored in the first storage unit 1113-3 is stored as a change record 119b-1.

When, for example, the user program resource 119a-1 has been changed, the received user program resource 119a-1 or the changed user program resource 119a-1 in the data container 119a (difference) is stored as the change record 119b-1.

When the data container 119a is changed by deleting or adding a user program resource 119a-1 contained in the data container 119a, the changed data container 119a (with the user program resource 119a-1 deleted or added) is stored as a change record 119b-1.

After the change record 119b-1 is stored, the first user program generation unit 1115 determines whether to generate a user program 1131 (step S8). In the present embodiment, the first user program generation unit 1115 determines this based on whether it has received an instruction from the generation instruction unit 1117. In the present embodiment, the first user program generation unit 1115 determines to generate a user program 1131 in response to a user program generation instruction transmitted from the program development support apparatus 3 to the generation instruction unit 1117.

In the controller 11 according to the modification shown in FIG. 3B, the first user program generation unit 1115 determines to generate a user program 1131 every time when the first change management unit 1113-1 detects a change in the data container 119a (for every change).

When the first user program generation unit 1115 determines not to generate a user program 1131 (No in step S8), the updating process of the user program 1131 ends. As a result, information about the change in the data container 119a (change record 119b-1) made without generating the user program 1131 can be stored.

When the first user program generation unit 1115 determines to generate a user program 1131 (Yes in step S8), a new data container 119a is generated and stored (step S9).

More specifically, the first change management unit 1113-1 generate a new data container 119a in the manner described above based on the data container 119a stored in the first update history 119b and the change record 119b-1 designated by the change record designation information included in a user program generation instruction.

After generating the new data container 119a, the first change management unit 1113-1 stores the generated new data container 119a into the first storage unit 1113-3.

After storing the new data container 119a into the first storage unit 1113-3, the first user program generation unit 1115 generates a new user program 1131 based on a new user program resource 119a-1 included in the new data container 119a stored in the first storage unit 1113-3 (step S10).

After generating the new user program 1131, the first user program generation unit 1115 can, for example, write the generated new user program 1131 into the storage area of the RAM 113 storing the currently running user program 1131 to set the new user program 1131 to be executed when a subsequent task is executed (step S11).

The steps described above allow the control system 100 (controller 11) to share information about the stage of change (change record 119b-1) of the data container including the user program resource that has been used to generate the currently running user program.

In addition, the details of any change in the data container 119a made without generating the user program 1131 can also be stored as a change record 119b-1. As a result, the details of all changes in the user program 1131 can be referred to in the first update history 119b.

When the user program is updated through the processing in steps S1 to S11, the control target device 7 is to be stopped only when a user program generation instruction is received (at a predetermined timing) in step S8 and the user program 1131 is replaced with the new user program 1131 in step S11. This shortens the suspension time of the control target device 7 caused by changing the user program 1131.

2. Second Embodiment

Figure 6:
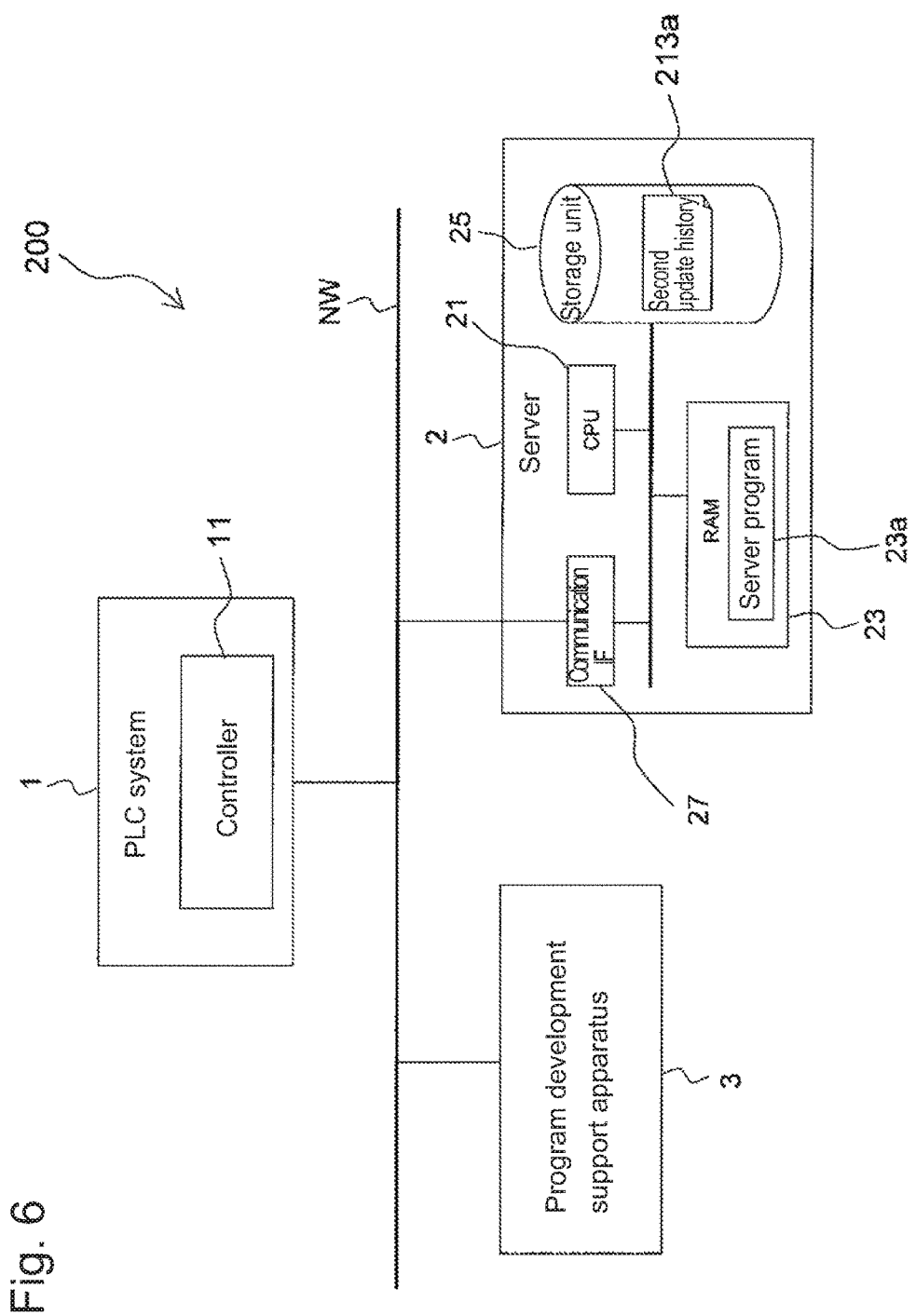
FIG. 6 is a diagram showing the configuration of a control system according to a second embodiment.

The control system 100 according to the first embodiment described above includes no computer other than the program development support apparatus 3. However, the control system may have any other configuration. As shown in FIG. 6, a control system 200 according to a second embodiment described below may further be connected to a server 2. FIG. 6 is a diagram showing the configuration of the control system according to the second embodiment.

The control system 200 according to the second embodiment includes a PLC system 1, a program development support apparatus 3, and the server 2. In the control system 200 according to the second embodiment, a controller 11 for the PLC system 1, the program development support apparatus 3, and the server 2 are connected to one another in a communicable manner via a communication network NW.

The PLC system 1 (controller 11) and the program development support apparatus 3 in the control system 200 according to the second embodiment are the same as the PLC system 1 and the program development support apparatus 3 in the first embodiment and will not be described.

The server 2 is, for example, a computer that operates as a server. As shown in FIG. 6, the server 2 thus includes a CPU 21, which is responsible for computational processing such as program execution, a RAM 23, which stores a server program 23a for implementing a server function, a storage unit 25, which provides a storage area for a second update history 213a (described later), and a communication interface 27.

The communication interface 27 allows data transmission and reception to and from the controller 11 and the program development support apparatus 3 based on the same protocol as the data communication protocol in the control system 200. In the present embodiment, the communication interface 27 is thus, for example, an interface allowing communications based on the TCP/IP protocol.

Figure 7:
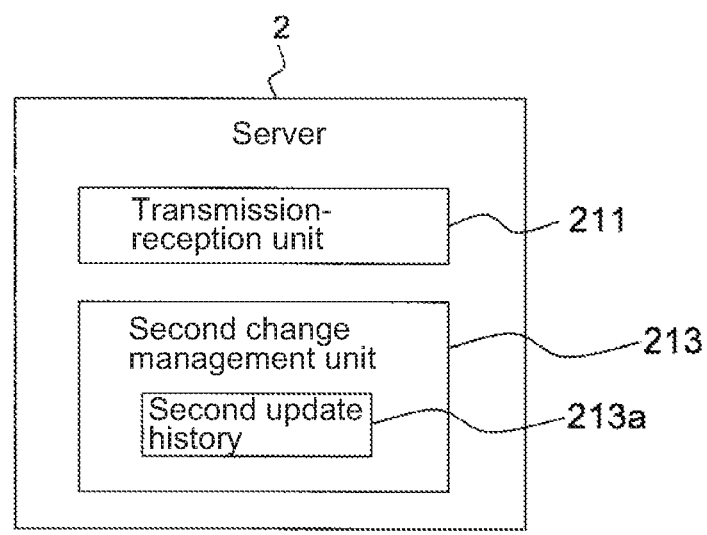
FIG. 7 is a diagram showing the configuration of a server in detail.

The configuration of the server 2 will now be described in detail with reference to FIG. 7. FIG. 7 is a diagram showing the configuration of the server in detail. The server program 23a implements the functions of the components of the server 2 shown in FIG. 7.

As shown in FIG. 7, the server 2 includes a transmission-reception unit 211 and a second change management unit 213. The transmission-reception unit 211 allows data transmission and reception to and from the controller 11 and the program development support apparatus 3 via the communication interface 27.

The second change management unit 213 stores a second update history 213a. The second update history 213a stores change records 119b-1 of a data container 119a. The second change management unit 213 stores a change record 119b-1 into the second update history 213a with the three methods described below.

The first method is to store a duplicate update history, which is a copy of a first update history 119b stored in a first change management unit 1113-1 included in the controller 11, as the second update history 213a (mirroring). This allows the second change management unit 213 to constantly store the second update history 213a identical to the first update history 119b. In other words, the first update history 119b can be stored in the second change management unit 213 as backup data.

The second method is to store a backup copy of the first update history 119b into the second change management unit 213 as the second update history 213a (backup) with the controller 11 (first change management unit 1113-1). The first update history 119b can also be stored in the second change management unit 213 as backup data.

The second change management unit 213 receives a change in the data container 119a from an external unit (program development support apparatus 3), and then stores the external change record, which is the change record of the data container 119a received from the program development support apparatus 3, into the second update history 213a. The second change management unit 213 transmits the external change record stored in the second update history 213a to the first change management unit 1113-1 (restoring).

The first change management unit 1113-1 stores the received external change record into the first update history 119b. The first change management unit 1113-1 also stores a data container 119a generated based on the external change record at a predetermined timing into the first storage unit 1113-3.

As a result, when a request for changing change the data container 119a is transmitted from an external unit, such as the program development support apparatus 3, the change record 119b-1 of the data container 119a received from the external unit can be stored in both the first update history 119b of the first change management unit 1113-1 and the second update history 213a of the second change management unit 213.

As described above, the server 2 included in the control system 200 can store the first update history 119b stored in the controller 11 as backup data. Thus, the first update history 119b stored in the server 2 can be transmitted back to the controller 11 when the first update history 119b stored in the controller 11 cannot be accessed or the first update history 119b is lost from the controller 11 due to, for example, malfunction of the controller 11.

3. Third Embodiment

Figure 8A:
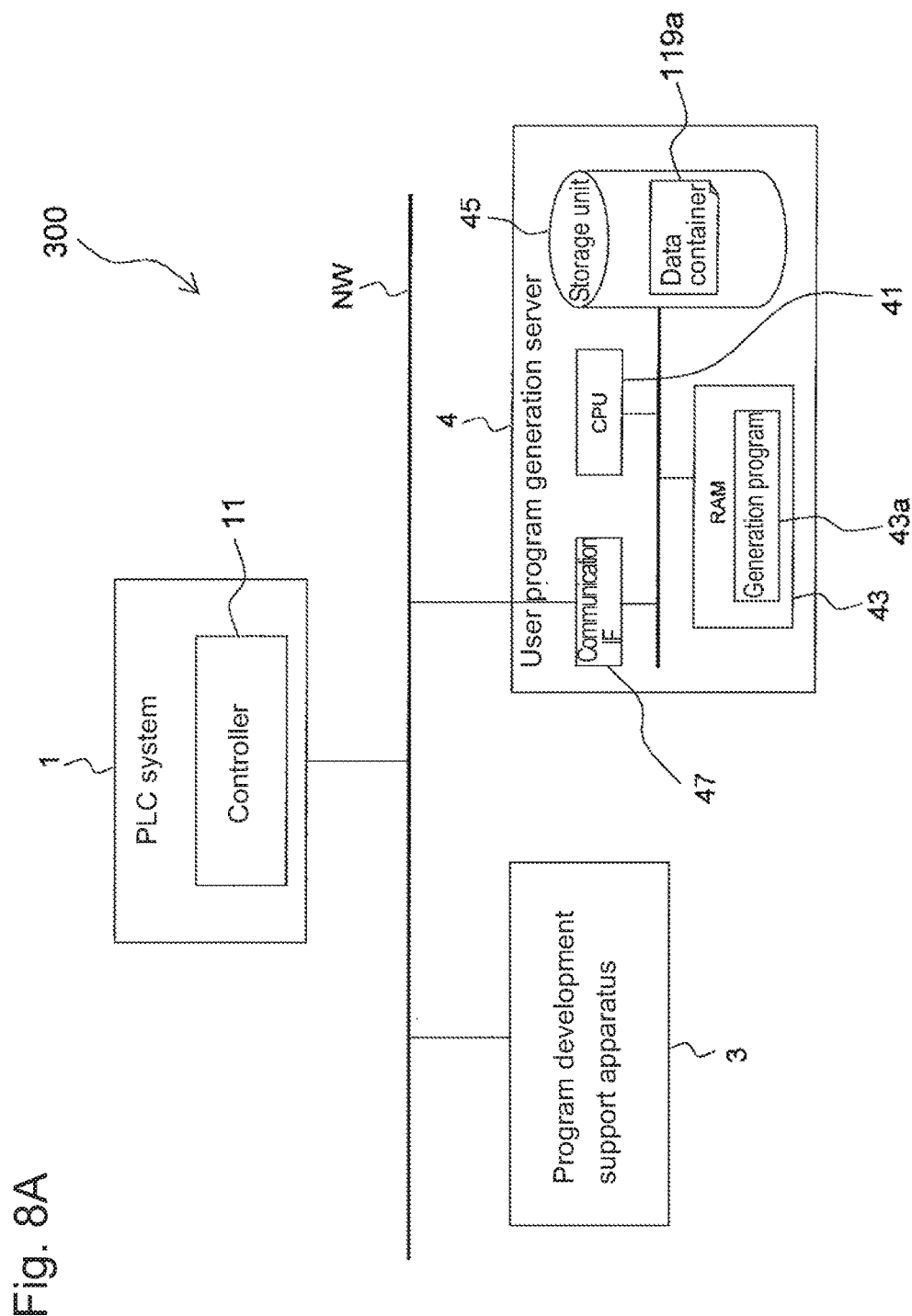
FIG. 8A is a diagram showing the configuration of a control system according to a third embodiment.
Figure 8B:
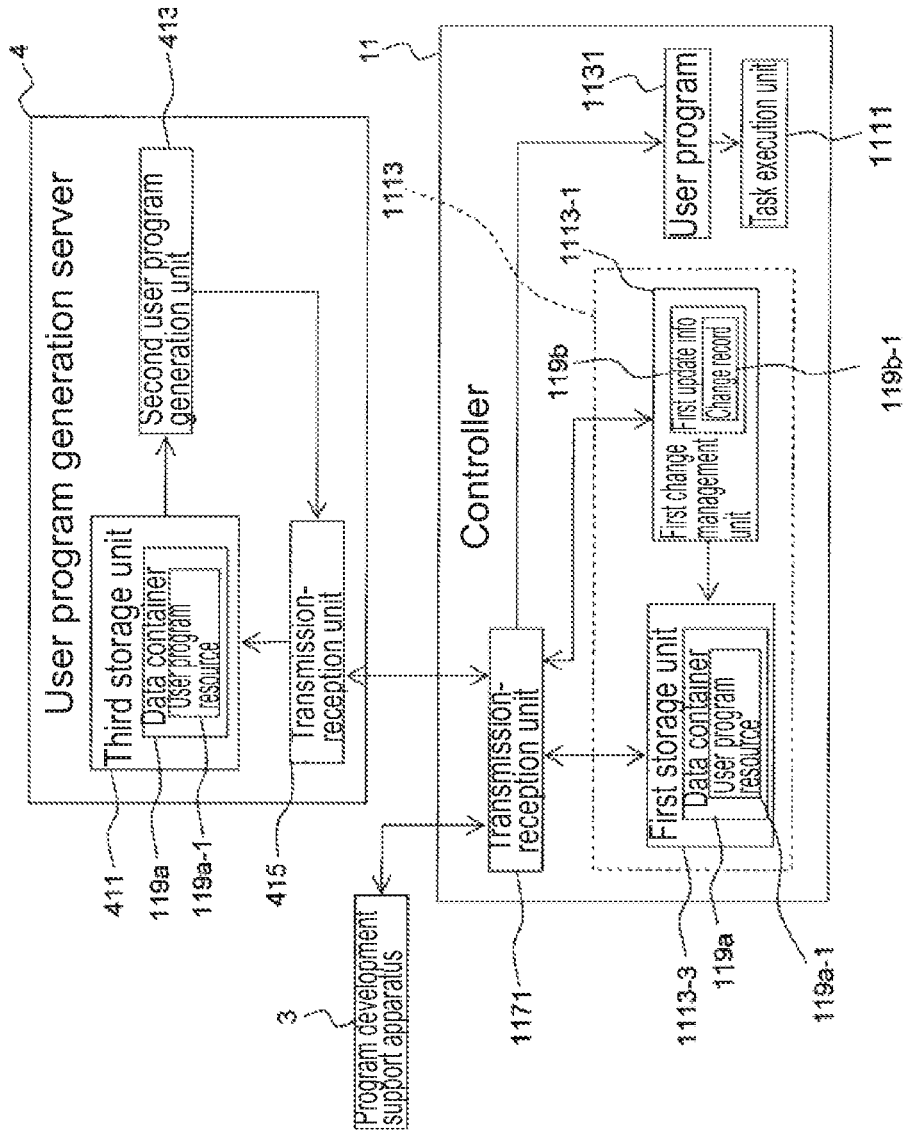
FIG. 8B is a diagram showing the configuration of the control system according to the third embodiment in detail.

In the control system 100 according to the first embodiment and the control system 200 according to the second embodiment described above, the controller 11 has the function of generating an executable user program 1131 (first user program generation unit 1115). However, the control system may have any other configuration. As shown in FIGS. 8A and 8B, a control system 300 according to a third embodiment may include a user program generation server 4 for generating an executable user program 1131. FIG. 8A is a diagram showing the configuration of the control system 300 according to the third embodiment. FIG. 8B is a diagram showing the configuration of the control system 300 according to the third embodiment in detail.

The control system 300 according to the third embodiment includes a PLC system 1, a program development support apparatus 3, and the user program generation server 4. In the control system 300 according to the third embodiment, a controller 11 for the PLC system 1, the program development support apparatus 3, and the user program generation server 4 are connected to one another in a communicable manner via a communication network NW, as shown in FIG. 8A.

The program development support apparatus 3 in the control system 300 according to the third embodiment is the same as the program development support apparatus 3 in the first embodiment and will not be described.

As shown in FIG. 8B, the controller 11 for the PLC system 1 has the same configuration as the controller 11 in the first or second embodiment except that the first user program generation unit 1115 and the generation instruction unit 1117 are eliminated. Thus, the controller 11 will not be described in detail.

The user program generation server 4 is, for example, a computer operating as a server. As shown in FIG. 8A, the user program generation server 4 thus includes a CPU 41, which is responsible for computational processing such as program execution, a RAM 43, which stores a generation program 43a for generating a user program 1131, a storage unit 45, which provides a storage area for a data container 119a, the controller 11, and optionally a communication interface 47, which allows data communications with the program development support apparatus 3.

The configuration of the user program generation server 4 will now be described in detail with reference to FIG. 8B. The generation program 43a implements the functions of the components of the user program generation server 4 shown in FIG. 8B.

As shown in FIG. 8B, the user program generation server 4 includes a third storage unit 411, a second user program generation unit 413, and a transmission-reception unit 415.

The third storage unit 411 receives and stores a data container 119a generated in the first change management unit 1113-1. The second user program generation unit 413 generates a user program 1131 using a user program resource 119a-1 in the data container 119a stored in the third storage unit 411. The second user program generation unit 413 transmits the generated user program 1131 to the controller 11.

The transmission-reception unit 415 allows data transmission and reception to and from the controller 11, and the program development support apparatus 3 as appropriate, via the communication interface 47.

In the control system 300 according to the third embodiment, the first change management unit 1113-1 generates a new data container 119a using a change record 119b-1 at a predetermined timing (e.g., the timing at which a user program generation instruction is received from the program development support apparatus 3), and stores the new data container 119a into the first storage unit 1113-3 and also into the third storage unit 411 of the user program generation server 4.

When the new data container 119a is stored into the third storage unit 411, the second user program generation unit 413 generates the user program 1131 using the new data container 119a stored in the third storage unit. The second user program generation unit 413 transmits the generated user program 1131 to the controller 11.

The controller 11, which receives the generated user program 1131, writes the received user program 1131 into an area of the RAM 113 storing an existing user program 1131. As a result, the user program 1131 generated in the user program generation server 4 is stored as the user program 1131 in the controller 11.

As described above, a user program 1131 is generated by the user program generation server 4. This reduces the computational load of the controller 11.

4. Matters Common to Embodiments

The first to third embodiments have the components and functions described below.

The controller 11 according to the first or second embodiment (an example of a controller) each include the task execution unit 1111 (an example of a task execution unit), the first storage unit 1113-3 (an example of a first storage unit), the first change management unit 1113-1 (an example of a first change management unit), and the first user program generation unit 1115 (an example of a first user program generation unit).

The task execution unit 1111 repeatedly executes the task including the user program 1131 (an example of a user program) for controlling the control target device 7 (an example of a control target device) in every predetermined period. The first storage unit 1113-3 stores the data container 119a (an example of a data container). The data container 119a contains a user program resource 119a-1 (an example of a user program resource). The user program resource 119a-1 is used to generate a user program 1131.

In response to a change in the data container 119a stored in the first storage unit 1113-3, the first change management unit 1113-1 stores the change record 119b-1 (an example of a change record) of the data container 119a into the first update history 119b (an example of a first update history). Additionally, the first change management unit 1113-1 stores, into the first storage unit 1113-3, a new data container 119a generated at a predetermined timing using the change record 119b-1.

The first user program generation unit 1115 generates a user program 1131 at a predetermined timing using a new user program resource 119a-1 contained in the new data container 119a stored in the first storage unit 1113-3.

In the controller 11 according to the first or second embodiment, the first change management unit 1113-1 stores a change record 119b-1 of the data container 119a into the first update history 119b in response to a change in the data container stored in the first storage unit 1113-3. The first change management unit 1113-1 also generates a new data container 119a at a predetermined timing using the change record 119b-1 and stores the generated new data container 119a into the first storage unit 1113-3.

The first user program generation unit 1115 then generates a new user program 1131 at a predetermined timing using a new user program resource 119a-1 contained in the new data container 119a stored in the first storage unit 1113-3.

In the controller 11 according to the first or second embodiment, the new data container 119a containing the new user program resource 119a-1 used to generate the new user program 1131 is thus stored in the first storage unit 1113-3. The change record 119b-1 of the data container 119a is also stored in the first update history 119b.

The controller 11 according to the first or second embodiment allows sharing of information about the stage of change (change record 119b-1) of the data container 119a containing the user program resource 119a-1 that has been used to generate the currently running user program 1131. More specifically, the controller 11 allows sharing of information about the stage of change in the currently running user program 1131.

The first user program generation unit 1115 generates a user program 1131 at a predetermined timing. This shortens the suspension time of the control target device caused by updating the user program when the user program 1131 is changed with the online editing function. The suspension time of the control target device 7 caused by updating the user program 1131 occurs only when the user program 1131 is generated (specifically, only at a predetermined timing).

In the controller 11 according to the first or second embodiment, the predetermined timing is the timing at which the first change management unit 1113-1 detects a change in the data container 119a. This allows the controller 11 to generate the latest updated user program 1131 using the most recently changed data container 119a, while maintaining the details of the change in each stage of the data container 119a in the change record 119b-1.

In the controller 11 according to the first or second embodiment, the predetermined timing is the timing at which a user program generation instruction (an example of a user program generation instruction) is received from an external unit. The user program generation instruction includes change record designation information (an example of change record designation information) for designating the change record 119b-1 in the first update history 119b used to generate a new data container 119a.

The first user program generation unit 1115 generates a user program 1131 using the new data container 119a generated using the change record 119b-1 designated by the change record designation information.

This allows a new user program 1131 to be generated at a predetermined timing. Designating the change record 119b-1 in the first update history 119b used to generate a new data container 119a allows the user program 1131 to be generated using the data container 119a at any designated stage of change (change record 119b-1).

When the controller 11 according to the first or second embodiment receives a changed user program 1131 and a change data container 119a (an example of a change data container) from an external unit, the change data container 119a is stored into the first storage unit 1113-3. The change data container 119a is a data container containing a changed user program resource 119a-1 (an example of a changed user program resource) used to generate the changed user program 1131.

The first change management unit 1113-1 stores a change record 119b-1 of the change data container 119a in the first update history 119b. Additionally, the changed user program 1131 is set as the new user program 1131 that is subsequently executed by the task execution unit.

This allows sharing of information about the details of a change in the user program 1131 made by an external unit.

The control system 200 according to the second embodiment includes the controller 11 and the server 2 (an example of a server). The server 2 is connected to the controller 11 in a communicable manner. The server 2 also includes the second change management unit 213 (an example of a second change management unit). The second change management unit stores a change record 119b-1 of the data container 119a.

This allows the change record 119b-1 of the data container 119a to be stored in the second change management unit 213, in addition to the first change management unit 1113-1 of the controller 11.

The second change management unit 213 stores a duplicate update history (an example of a duplicate update history) as a second update history 213a (an example of a second update history). The duplicate update history is a copy of the first update history 119b stored in the first change management unit 1113-1. This allows the second change management unit 213 to store the second update history 213a, which is identical to the first update history 119b. In other words, the first update history 119b can be stored in the second change management unit 213 as backup data.

The first change management unit 1113-1 stores a backup copy of the first update history 119b into the second change management unit 213 as the second update history 213a. The first update history 119b can also be stored in the second change management unit 213 as backup data.

The second change management unit 213 receives a change in the data container 119a from an external unit and then stores its external change record (an example of an external change record) into the second update history 213a. The external change record is a change record 119b-1 of the data container 119a received from the external unit. The second change management unit 213 also transmits the external change record to the first change management unit 1113-1.

The first change management unit 1113-1 stores the external change record into the first update history, and stores the data container 119a generated based on the external change record at a predetermined timing into the first storage unit 1113-3.

As a result, when a request to change the data container 119a is transmitted from an external unit, the change record 119b-1 of the data container 119a received from the external unit can be stored in both the first update history 119b of the first change management unit 1113-1 and the second update history 213a of the second change management unit 213.

When the controller 11 receives a changed user program 1131 and a change data container 119a from an external unit, the change data container 119a is stored into the first storage unit 1113-3 and the change record 119b-1 is stored into the second update history 213a of the second change management unit 213. Additionally, the changed user program 1131 is set as the new user program 1131 that is subsequently executed by the task execution unit 1111.

As a result, when the user program 1131 is changed by an external unit, the data container 119a used to generate the user program 1131 by the external unit can be stored in both the first storage unit 1113-3 and the second update history 213a. In other words, the data container 119a can be stored as backup data.

The control system 300 according to the third embodiment includes the controller 11 and the user program generation server 4 (an example of a user program generation server).

In the control system 300 according to the third embodiment, the controller 11 includes the task execution unit 1111, the first storage unit 1113-3, and the first change management unit 1113-1. The task execution unit 1111 repeatedly executes the task including the user program 1131 for controlling the control target device 7 in every predetermined period. The first storage unit 1113-3 stores a data container 119a containing a user program resource 119a-1 used to generate the user program 1131. When the data container 119a stored in the first storage unit 1113-3 is changed, the first change management unit 1113-1 stores the change record 119b-1 of the data container 119a into the first update history 119b. The first change management unit 1113-1 also stores a new data container 119a generated using the change record 119b-1 at a predetermined timing into the first storage unit 1113-3.

The user program generation server 4 includes the third storage unit 411 (an example of a third storage unit) and the second user program generation unit 413 (an example of a second user program generation unit).

The third storage unit 411 receives and stores a data container 119a generated in the first change management unit 1113-1. The second user program generation unit 413 generates a user program 1131 using a user program resource 119a-1 contained in the data container 119a stored in the third storage unit 411. The second user program generation unit 413 transmits the generated user program 1131 to the controller 11.

In the control system 300, the first change management unit 1113-1 generates a new data container 119a using a change record 119b-1 at a predetermined timing, and then stores the new data container 119a into the first storage unit 1113-3 and also into the third storage unit 411 of the user program generation server 4. The new data container 119a stored in the third storage unit 411 is used to generate a user program 1131.

In this manner, the user program 1131 can be generated by an external server (user program generation server 4). This reduces the computational load of the controller 11.

5. Other Embodiments

Although the embodiments of the present invention have been described, the invention is not limited to the above embodiments. The embodiments may be modified variously without departing from the spirit and scope of the invention. In particular, the embodiments and modifications described herein may be combined freely as appropriate.

INDUSTRIAL APPLICABILITY

One or more embodiments of the present invention are widely applicable to controllers for controlling a control target device by repeatedly executing a user program in every predetermined period, and to control systems including such controllers.

REFERENCE SIGNS LIST 100, 200, 300 control system
1 PLC system
11 controller
111 CPU
1111 task execution unit
1113 data container generation unit 1113-1 first change management unit
1113-3 first storage unit
1115 first user program generation unit
1117 generation instruction unit
113 RAM
1131 user program
115 ROM
115a system program
117 communication interface
1171 transmission-reception unit
119 storage unit
119a data container
119a-1 user program resource
119b first update history
119b-1 change record
119b-11 update number field
119b-12 update target field
119b-13 update type field
119b-14 update user field
119b-15 update date and time field
119b-16 user program generation field
119b-17 note field
13 input unit
15 output unit
17 power supply unit
2 server
21 CPU
211 transmission-reception unit
213 second change management unit
213a second update history
23 RAM
23a server program
25 storage unit
27 communication interface
3 program development support apparatus
31 CPU
33 storage unit
33a development support program
35 operation unit
37 communication interface
39 display unit
4 user program generation server
41 CPU
411 third storage unit
413 second user program generation unit
415 transmission-reception unit
43 RAM
43a generation program
45 storage unit
47 communication interface
5 signal input unit
7 control target device
NW communication network

The invention claimed is:

1. A controller, comprising a processor configured with a program to perform operations comprising:
   operation as a task execution unit configured to execute a task repeatedly in a predetermined period, the task comprising a user program for controlling a control target device;
   operation as a first storage unit configured to store a data container containing a user program resource comprising a configuration file used to generate the user program;
   operation as a first change management unit configured to store a change record of the data container into a first update history and store a new data container generated using the change record at a predetermined timing into the first storage unit when the data container stored in the first storage unit is changed; and
   operation as a first user program generation unit configured to generate the user program at the predetermined timing using a new user program resource comprising a new configuration file contained in the new data container stored in the first storage unit.

2. The controller according to claim 1, wherein
   the predetermined timing is a timing at which the first change management unit detects a change in the data container.

3. The controller according to claim 1, wherein
   the predetermined timing is a timing at which a user program generation instruction including change record designation information for designating a change record stored in the first update history used to generate the new data container is received from an external unit, and
   the first user program generation unit generates the user program using the new data container generated using the change record designated by the change record designation information.

4. The controller according to claim 1, wherein
   when a changed user program and a change data container containing a changed configuration file used to generate the changed user program are received from an external unit,
   the change data container is stored into the first storage unit,
   the first change management unit stores a change record of the change data container into the first update history, and
   the changed user program is set as a new user program that is subsequently executed by the task execution unit.

5. A control system, comprising:
   the controller according to claim 1; and
   a server connected to the controller in a communicable manner comprising a processor configured with a program to perform operations comprising:
   operation as a second change management unit configured to store a second update history for storing a change record of the data container.

6. The control system according to claim 5, wherein
   the second change management unit stores, as the second update history, a duplicate update history that is a copy of the first update history stored in the first change management unit.

7. The control system according to claim 5, wherein
   the first change management unit stores a backup copy of the first update history into the second change management unit as the second update history.

8. The control system according to claim 5, wherein
   the second change management unit receives a change in the data container from an external unit, stores an external change record that is a change record of the data container received from the external unit into the second update history, and transmits the external change record to the first change management unit, and
   the first change management unit stores the external change record into the first update history and stores a data container generated at a predetermined timing based on the external change record into the first storage unit.

9. The control system according to claim 5, wherein when a changed user program and a change data container containing a changed user program resource used to generate the changed user program are received by the controller from an external unit, the change data container is stored into the first storage unit and a change record is stored into the second update history in the second change management unit, and the changed user program is set as a new user program that is subsequently executed by the task execution unit.

10. A control system, comprising:
a controller comprising a processor configured with a program to perform operations comprising:
 operation as a task execution unit configured to execute a task repeatedly in a predetermined period, the task comprising a user program for controlling a control target device,
 operation as a first storage unit configured to store a data container containing a user program resource comprising a configuration file used to generate the user program, and
 operation as a first change management unit configured to store a change record of the data container into a first update history and store a new data container generated using the change record at a predetermined timing into the first storage unit when the data container stored in the first storage unit is change; and
a user program generation server comprising a processor configured with a program to perform operations comprising:
operation as a third storage unit configured to receive and store the data container generated in the first change management unit, and
 operation as a second user program generation unit configured to generate the user program using a user program resource comprising a configuration file contained in the data container stored in the third storage unit and transmit the user program to the controller.

* * * * *